United States Patent
Iwasa (10) Patent No.: US 6,948,086 B2
(45) Date of Patent: Sep. 20, 2005

(54) COMPUTER SYSTEM

(75) Inventor: Shigeki Iwasa, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 533 days.

(21) Appl. No.: 10/255,654

(22) Filed: Sep. 25, 2002

(65) Prior Publication Data

US 2003/0061529 A1 Mar. 27, 2003

(30) Foreign Application Priority Data

Sep. 27, 2001 (JP) .................................. P2001-298391

(51) Int. Cl.⁷ ............................................. G06F 9/445
(52) U.S. Cl. ................................................... 713/500
(58) Field of Search ......................................... 713/500

(56) References Cited

U.S. PATENT DOCUMENTS 6,271,675 B1 * 8/2001 Sakaki ..................... 324/756
6,370,643 B1 * 4/2002 Kubo ........................... 713/1
2002/0167859 A1 * 11/2002 Chun ......................... 365/233

FOREIGN PATENT DOCUMENTS

JP 2001-184225 7/2001

OTHER PUBLICATIONS

U.S. Appl. No. 09/748,284 filed on Dec. 27, 2000 corresponding to Japanese Patent Application No. P11–371736 published on Dec. 27, 1999.

* cited by examiner

Primary Examiner—John R. Cottingham
(74) Attorney, Agent, or Firm—DLA Piper Rudnick Gray Cary US LLP (57) ABSTRACT

Provided is a computer system which includes a CPU configured to execute instructions, a timing generator configured to provide an internal clock, and a selector configured to receive an external clock and the internal clock and to select any one of the external clock and the internal clock as a read-out timing signal with respect to an external memory device which stores an instruction to be executed initially after a power source is turned on.

21 Claims, 9 Drawing Sheets

COMPUTER SYSTEM

CROSS REFERENCE TO RELATED APPLICATIONS

This application is based upon and claims the benefit of priority from the prior Japanese Patent Application No. P2001-298391, filed on Sep. 27, 2001; the entire contents of which are incorporated herein by reference.

BACKGROUND OF THE INVENTION

1. Field of the Invention

The present invention relates to a computer system, more specifically, to timing control with respect to an external memory device.

2. Description of the Related Art

Rapid progresses in semiconductor integration technologies in recent years have enabled a central processing unit (CPU) of a computer to be integrated into a single semiconductor chip. Further, attempts for integrating a peripheral interface and a memory control circuit into the single chip are also ongoing. In terms of integrating an entire computer system into a single chip, such technologies are referred to as "system on a chip (SOC)" technologies or SOC products.

A memory device for storing instructions to be first executed in start-up processing of a computer after power-on is generally referred to as a boot read only memory (ROM). The boot ROM is required to have characteristics that instruction codes are recordable thereon in advance and that contents can be retained when the power is off. The boot ROM stores different instruction sequences depending on the product to which the CPU is applied. Accordingly, the boot ROM is usually designed as an external element of a CPU chip.

Semiconductor elements suitable for use in the boot ROM include a variety of elements such as a mask ROM, an erasable and programmable ROM (EPROM), an electrically erasable programmable ROM (EEPROM), a flash ROM, and the like. Read time for the stored contents also varies depending on types of elements, price ranges and specifications of products. Accordingly, it is a common practice in a CPU chip integrating a boot ROM interface that several patterns of booting modes are predicted in advance and the CPU chip is set up so as to effectuate selection in line with product features or user orientation.

Normally, several signal lines are utilized for judging as to which type of the boot ROM is used, and identification and read time of the boot ROM is selected in the event of power-on or resetting, because the instructions stored in the boot ROM are instructions to be executed in the first place. As there is no instruction sequence executable beforehand, it is impossible to select read time by software.

Another judging method is to assume the slowest read time of a predictable ROM. In this method, the CPU chip operates in the slowest operating speed immediately after resetting and the operating speed for the ROM is set again depending on the instruction retrieved at that stage.

However, the above-described computer system involves the following problems.

1) An SOC product in recent years requires numerous terminals as a result of mounting various peripheral interfaces, peripherals themselves and memory interfaces in one chip. Moreover, although an operating frequency of each terminal is not as high as a frequency of an internal circuit, yet the operating frequency is increasing every year. Accordingly, an expensive package and terminals applicable to high frequencies are becoming indispensable. Generally, a terminal structure of a package depends on the maximum frequency of an applicable chip. In other words, the package structure does not reflect the frequency to be applied actually to the terminal. This is due to the fact that modification of the terminal structure depending on an execution frequency incurs cost increases to the contrary.

Therefore, in the above-described method of using several signal lines, it is necessary to allocate terminals for signals which operates only after resetting such as signals for setting up read-out speed for the boot ROM. Accordingly, there is a problem of incurring a cost increase as the number of terminal increases.

2) Meanwhile, in the method of assuming the slowest operating speed, there is a problem of low speed in executing the instructions before setting up the operating speed. Although this may rarely constitute a critical problem in an real chip, it will constitute considerable loads in the event of logic simulation for verifying operations and functions because the instruction sequence on the boot ROM is executed in every iteration of the logic verification.

Normally, logic quality of an SOC semiconductor element tends to be enhanced in response to an effort spent for the logic verification. Accordingly, reduction in the amount of the logic verification executable in a unit time period incurs a problem of difficulty in securing sufficient logic quality. On the contrary, if a sufficient verification amount is sought, then simulation time is increased and a cost increase is thereby incurred.

Furthermore, if the read time or timing thereof varies in excess of a expected range for the boot ROM element, then the method cannot be applied to such a product. Resultantly, there is also a problem of shortening a life cycle of the product.

SUMMARY OF THE INVENTION

According to an aspect of the present invention, a computer system, comprises a CPU configured to execute instructions, a timing generator configured to provide an internal clock, and a selector configured to receive an external clock and the internal clock, and to select any one of the external clock and the internal clock as a read-out timing signal with respect to an external memory device storing an instruction to be executed initially after a power source is turned on.

DETAILED DESCRIPTION OF THE INVENTION

Comparative Example

Figure 1:
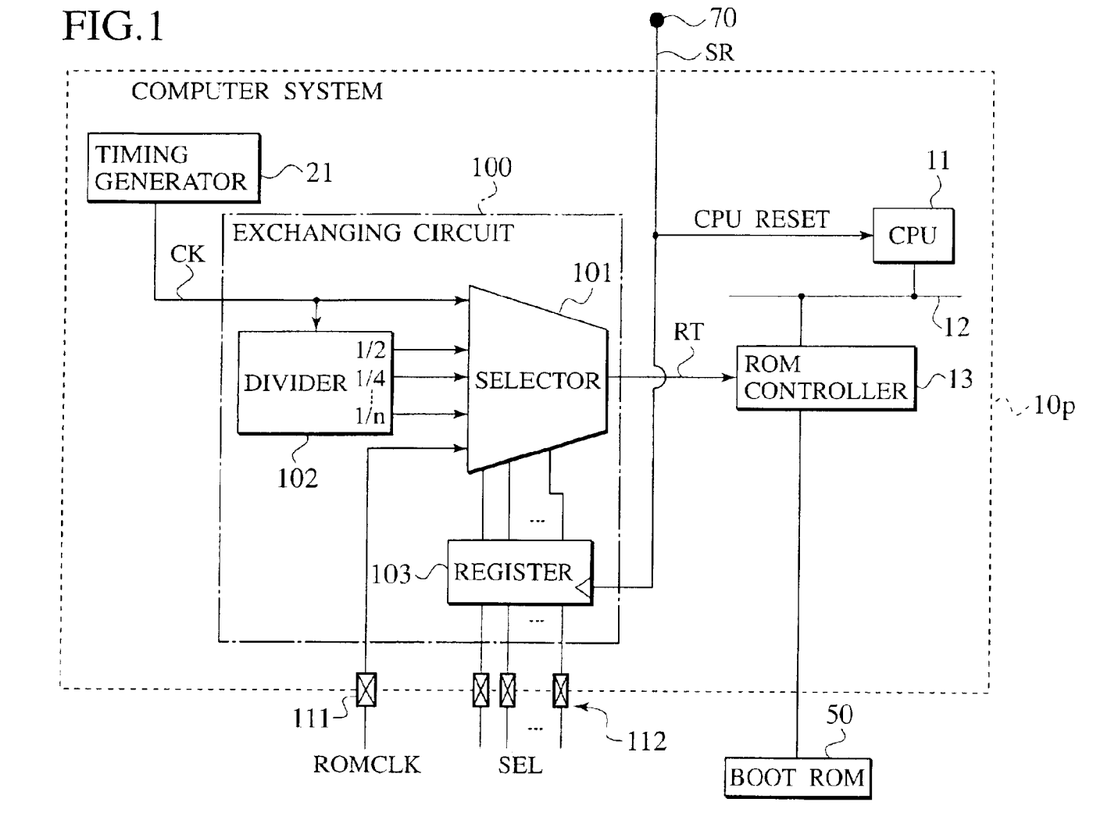
FIG. 1 is a block diagram showing an overall schematic constitution of a computer system preliminarily examined as a base of the present invention.

Before describing embodiments of the present invention, a comparative example shown in FIG. 1 will be explained. Specifically, in consideration of the above-mentioned problems, the inventors of the present invention have first examined a mode of supplying a timing signal of "read-out timing" for a ROM from outside, and synchronizing the time of address supply with "the read-out timing" for a boot ROM using the timing signal. As shown in FIG. 1, in this mode, a computer system 10p merged in a single chip includes an timing generator 21, and a CPU 11 and a ROM controller 13 severally connected to a system bus 12. Moreover, the computer system 10p also includes an exchanging circuit 100, which accepts an internal clock CK, an external clock ROMCLK, a external select signal SEL, and a system reset signal SR. The internal clock CK is supplied from the timing generator 21. The external clock ROMCLK is received through a timing signal input terminal 111. The external select signal SEL is received through a select signal input terminal 112. The system reset signal SR is received through an external system reset terminal 70.

Inside the exchanging circuit 100, included are a divider 102 for dividing the internal clock CK, a register 103 for storing the external select signal SEL, and a selector 101 for supplying either the internal clock CK or the external clock ROMCLK as a ROM timing signal RT, depending on the external timing select signal SEL. The ROM timing signal RT is supplied to the ROM controller 13. The ROM controller 13 sets up the address supply to a boot ROM 50 and the read-out timing in accordance with the ROM timing signal RT.

However, in the mode of supplying the timing signal from the outside as shown in FIG. 1, a timing generator is required outside the chip. In addition, the input terminal 112 is also provided therein to apply the external select signal SEL for selecting as to which one of the internal clock CK and the external clock ROMCLK is to be used. Accordingly, an external circuit for generating the external select signal SEL is also required. The inventors of the present invention have studied over the problems of the computer system 10p shown in FIG. 1, and have realized the following embodiments. Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

(First Embodiment)

Figure 2:
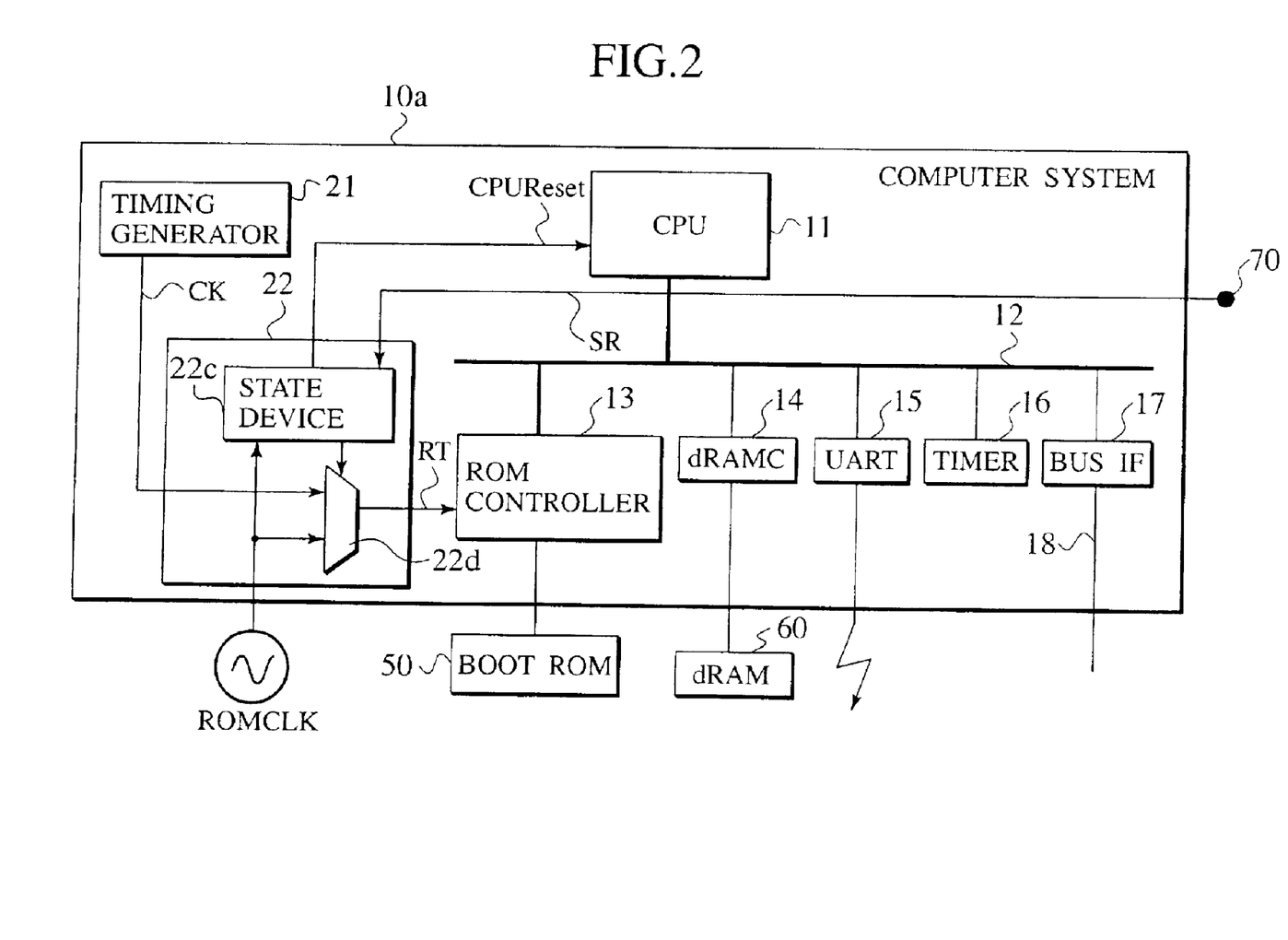
FIG. 2 is a block diagram showing an overall schematic constitution of a computer system according to a first embodiment of the present invention provided with an external reset terminal.

As shown in FIG. 2, a computer system according to a first embodiment of the present invention is provided with a system reset terminal 70 on the outside. Through the system reset terminal 70, a system reset signal SR is supplied to a computer system 10a.

The computer system 10a is merged as an SOC product in a single semiconductor chip. On the inside, the computer system 10a includes a CPU 11, a ROM controller 13, a dynamic random access memory (dRAM) controller 14, an universal asynchronous receiver/transmitter (UART) 15, a timer 16 and an external bus interface IF 17, which are severally connected to a system bus 12. Further, the computer system 10a also includes a timing generator 21, and a exchanging circuit 22 which is characteristic of this embodiment. Moreover, on the outside of the computer system 10a, a boot ROM 50 and dRAM 60 are connected thereto. In addition various unillustrated external devices are connected to an external bus 18 in accordance with various applications.

The CPU 11 controls the entire system inside the chip, reads a boot code on the boot ROM 50 or instruction sequences written in a machine language on the dRAM 60, operates data on the dRAM 60 or devices inside the chip or on the external bus 18, and thereby realizes a function targeted by the system. The ROM controller 13 serves as an interface with the boot ROM 50 on the outside.

Figure 3:
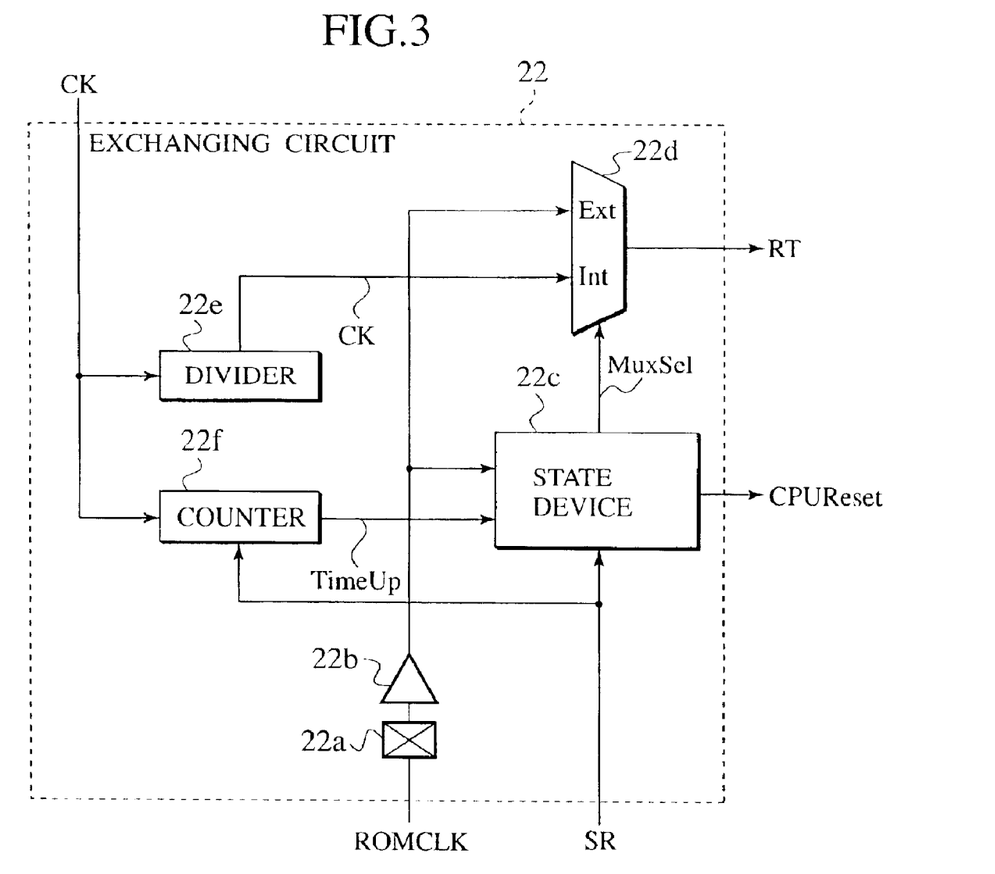
FIG. 3 is a circuit diagram showing a detailed constitution of an exchanging circuit 22 shown in FIG. 2.

Next, description will be made with reference to FIG. 3, regarding a detailed constitution of the exchanging circuit 22 shown in FIG. 2.

Figure 4:
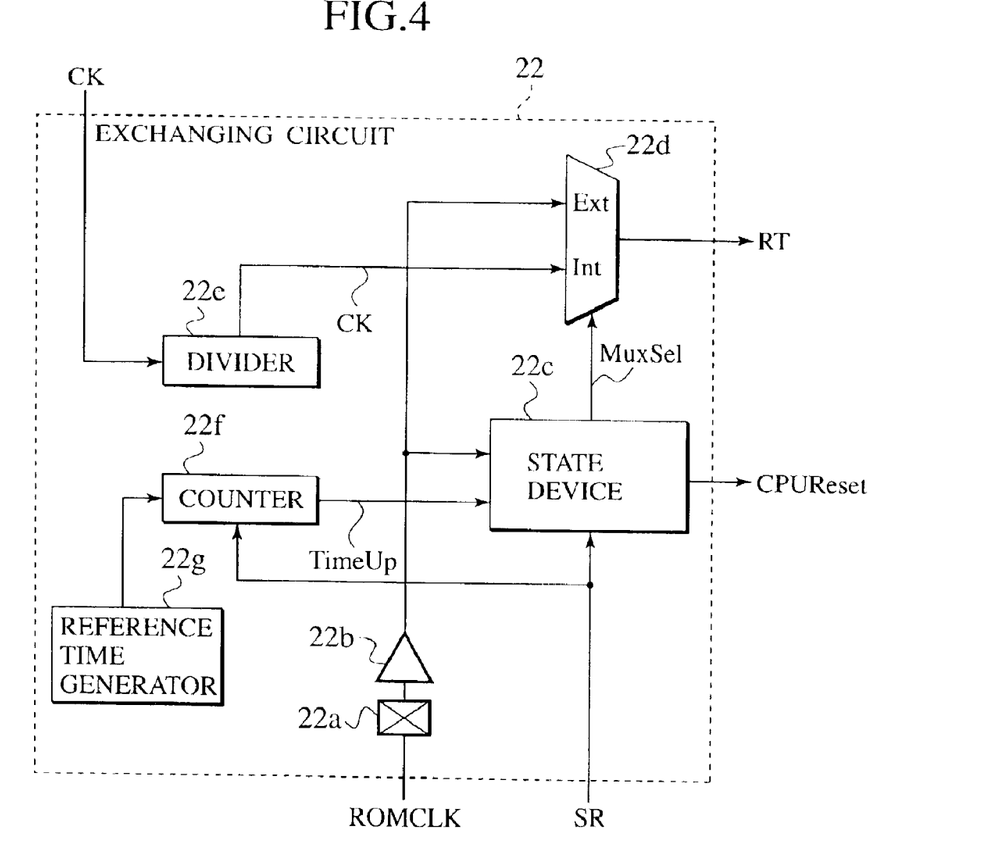
FIG. 4 is a circuit diagram showing another detailed constitution of the exchanging circuit 22 shown in FIG. 2.

An external clock ROMCLK, which is received from outside through a timing input terminal 22a and an input buffer 22b, is supplied to a state device 22c and is subjected to judgment as to whether the external clock ROMCLK contains an effective signal, and then supplied to an input side (an external clock side) of a signal switching selector 22d. The frequency of an internal clock CK is divided into a frequency suitable for ROM control by a divider 22e, and the divided internal clock is supplied to another input side (an internal clock side) of the selector 22d. The internal clock is also fed to a counter 22f. The counter 22f measures measuring time necessary for judgment of the received external clock ROMCLK. Here, as shown in FIG. 4, efficiency of the present invention will not be impaired by using another clock CKT generated by a reference time generator 22g instead of the internal clock CK. However, the mode shown in FIG. 3 can reduce a cost more effectively because use of the internal clock CK can curtail the reference time generator 22g.

Moreover, the state device 22c retains a CPU reset signal (CPUReset) active until a timing signal for the ROM control is determined, and thereby inhibits reading out of the instruction before the timing signal is determined.

Figure 5:
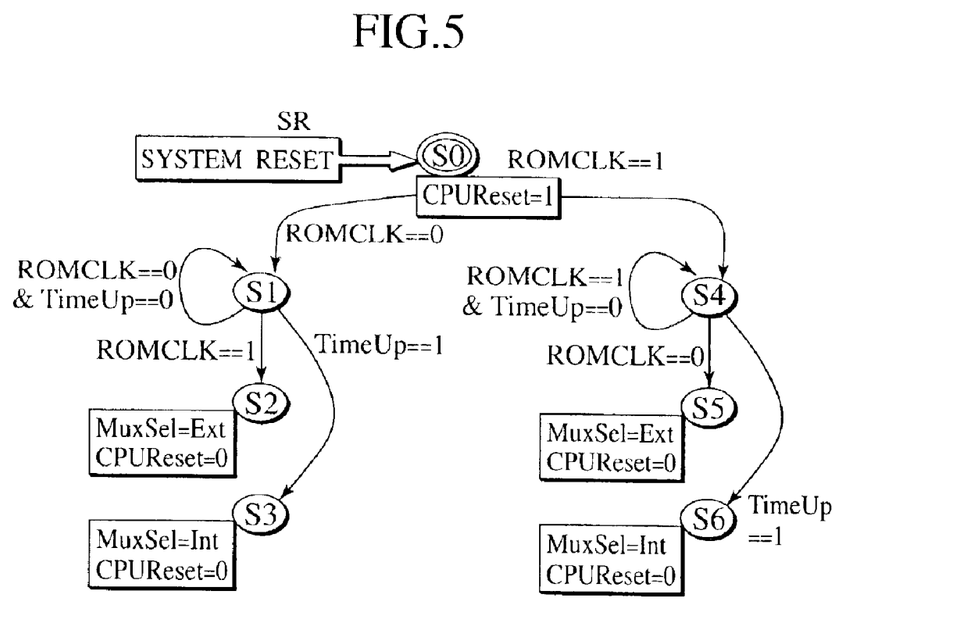
FIG. 5 is a view showing state transition of a state device 22c in the first embodiment.

State transitions of the state device 22c in the first embodiment will be now described with reference to FIG. 5.

After the system reset signal SR is supplied, the state device 22c is in an initial state S0. In this state, the state device 22c starts monitoring of a signal state of the external clock ROMCLK. A logic value of the external clock ROMCLK at the point of starting an operation (S0) is recorded in accordance with state transition (at a state S1 or a state S4), and variation of the logic value is detected.

When the logic value varies, such variation of the logic value is detected by transition to a state S2 or a state S5. In this case, effective repeating signals are recognized to be supplied to the external clock ROMCLK. Accordingly, the selector 22d is fixed to the external clock side (MuxSel=Ext) and negates the CPUReset signal, then a reset of the CPU 11 is thereby released.

Meanwhile, the counter 22f starts counting the internal clock CK when the system reset signal SR is supplied and then released. When the counter 22f counts a predetermined number, the counter 22f supplies a time-up signal (TimeUP) to the state device 22c.

When the TimeUp signal is received in the state S1 or the state S4, the state device 22c judges that the state of the external clock ROMCLK does not vary and a fixed value is given to the timing input terminal 22a for the external clock ROMCLK so that the timing signal is not effective. And thereby the state transits to a state S3 or to a state S6. Then, the state device 22c fixes the selector 22d to the internal clock side (MuxSel=Int) and the divided internal clock is supplied from the divider 22e, then the CPUReset signal is negated.

When the reset of the CPU 11 is released by deassertion of the CPUReset signal, the CPU 11 initializes the inside and sends a read-out request to the ROM controller 13 shown in FIG. 2 in order to read a first instruction. The ROM controller 13 interprets the request and has access to the external boot ROM 50 in accordance with a ROM timing signal RT selected by the exchanging circuit 22, and then returns a machine language instruction code thus obtained back to the CPU 11. Normally, operation transition such as modification of an address or retrieval of read-out data is carried out by detecting a positive edge (or leading edge) of the ROM timing signal RT. However, depending on the design of the ROM controller 13, it is also possible to use a negative edge (or trailing edge) thereof.

In this way, the CPU 11 starts an operation.

Upon performing logic simulation according to the first embodiment, it is possible to perform the logic simulation at the fastest frequency with the ROM timing signal RT, if the fastest repeating signals are fed to the external clock ROMCLK effective for an operation for the simulation. Verification with a slower frequency is also performed as functional verification of the ROM controller 13. However, in other verification programs (verification patterns), it is possible to perform the logic simulation with a fast frequency which is not operable with an actual ROM element, as long as the programs are not concerned with the functional verification of the ROM controller 13. The boot ROM 50 includes the instruction which is always executed in all verification patterns. Accordingly, if access speed of the boot ROM is set to high speed in the majority of the verification patterns, then it is possible to shorten total time for performing the logic simulation. As a result, it is possible to finish a product with high logic quality.

In the case of using an actual chip, when the boot ROM 50 is adapted to the internal clock CK, then the terminal 22a for receiving the external clock ROMCLK is fixed either to a "H" level or to a "L" level (i.e. connected to any one end of a power source level or ground level). In application, the boot ROM 50 is read out in accordance with the internal clock CK which is generated inside. In this case, any external clock generator is not necessary.

In the case of using a ROM with unique timing, repeating signals with a frequency corresponding to the ROM are supplied to the external clock ROMCLK. The application identifies the external clock ROMCLK thus supplied, and reads out the boot ROM 50 in accordance with the signal.

Judgment time (a time period until the time-up of the counter 22f) is set sufficiently longer than operating time of the boot ROM 50, and sufficiently shorter so that the delay of starting time in the CPU 11 cannot be sensed. The judgment time is generally set in a range from several hundred microseconds to several milliseconds. However, efficiency of the present invention is not affected with any value of the judgment time selected. If a signal in a longer cycle than the judgment time defined by the counter 22f is required for the purpose of debugging the ROM controller 13 or the boot ROM 50 itself, an input logic value may be varied only once immediately after resetting and then a predetermined frequency may be used before the CPU 11 starts operation. This is because the external clock ROMCLK is recognized to be effective, according to the first embodiment, if there is a signal variation just once during the judgment time.

As described above, according to the first embodiment, it is possible to use any boot ROM 50 operating with arbitrary timing, electing the signal waveform to be supplied to the timing input terminal 22a. Moreover, in the case of using the boot ROM 50 with the operation timing coincident with the internal clock CK, it is possible to use the internal clock CK by applying the fixed logic value to the timing input terminal 22a which is the external clock ROMCLK input. In this case, it is possible to curtail an external clock generator and to reduce system costs accordingly. Furthermore, since the timing input terminal 22a itself is used upon the above-described exchanging operation, it is also possible to curtail the input terminal 112 for exchanging as shown in the circuit in FIG. 1.

Figure 6:
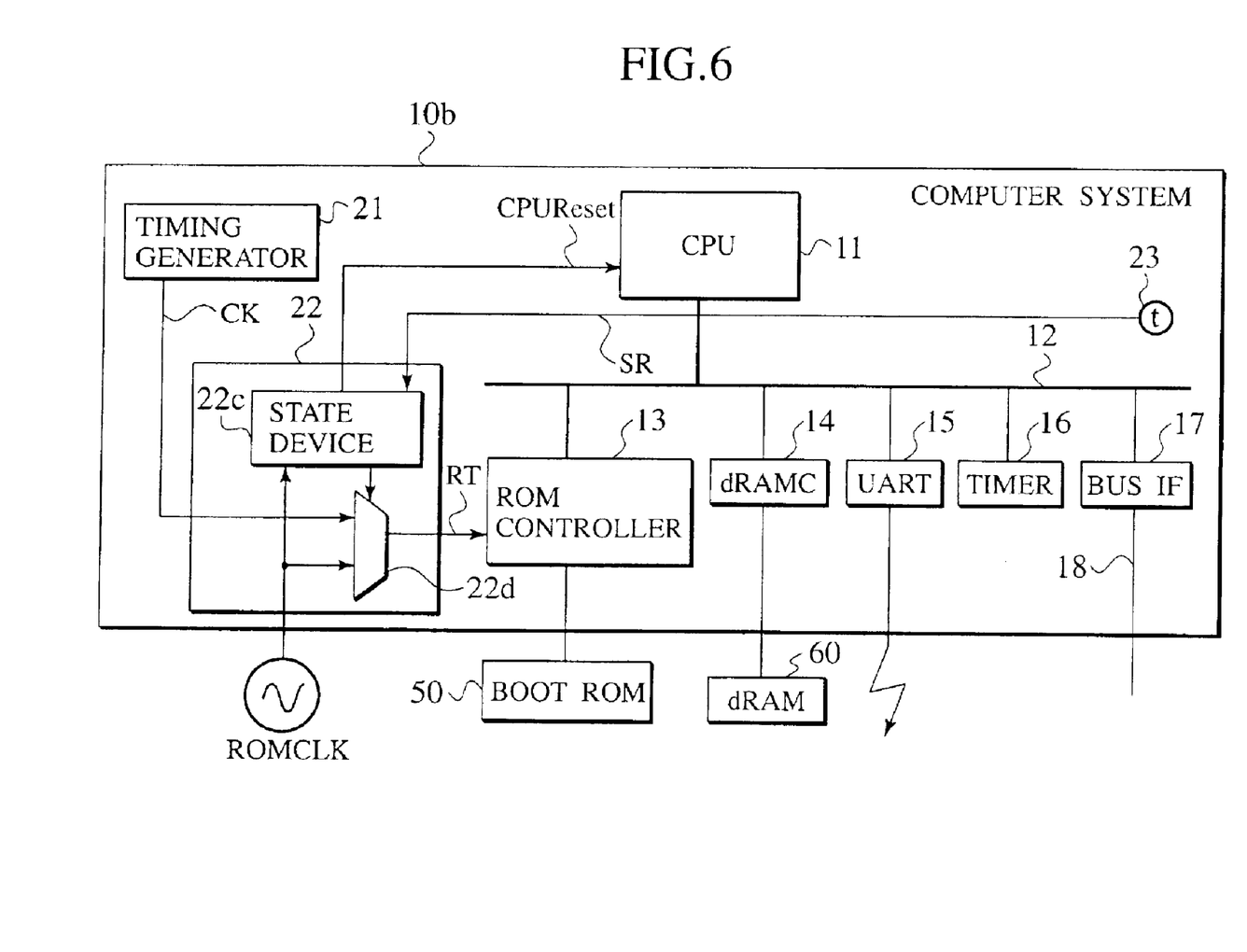
FIG. 6 is a block diagram showing an overall schematic constitution of a computer system according to a modified example of the first embodiment of the present invention provided with an internal reset timer.

As a modified example of the first embodiment, a reset timer 23 may be merged in a computer system 10b as shown in FIG. 6. And the system 10b may be reset by a system reset SR which is generated by the reset timer 23, or "watch dog reset". Note that a structure which includes both the reset terminal 70 as shown in FIG. 2 and the reset timer 23 as shown in FIG. 6 is also feasible.

(Second Embodiment)

Figure 7:
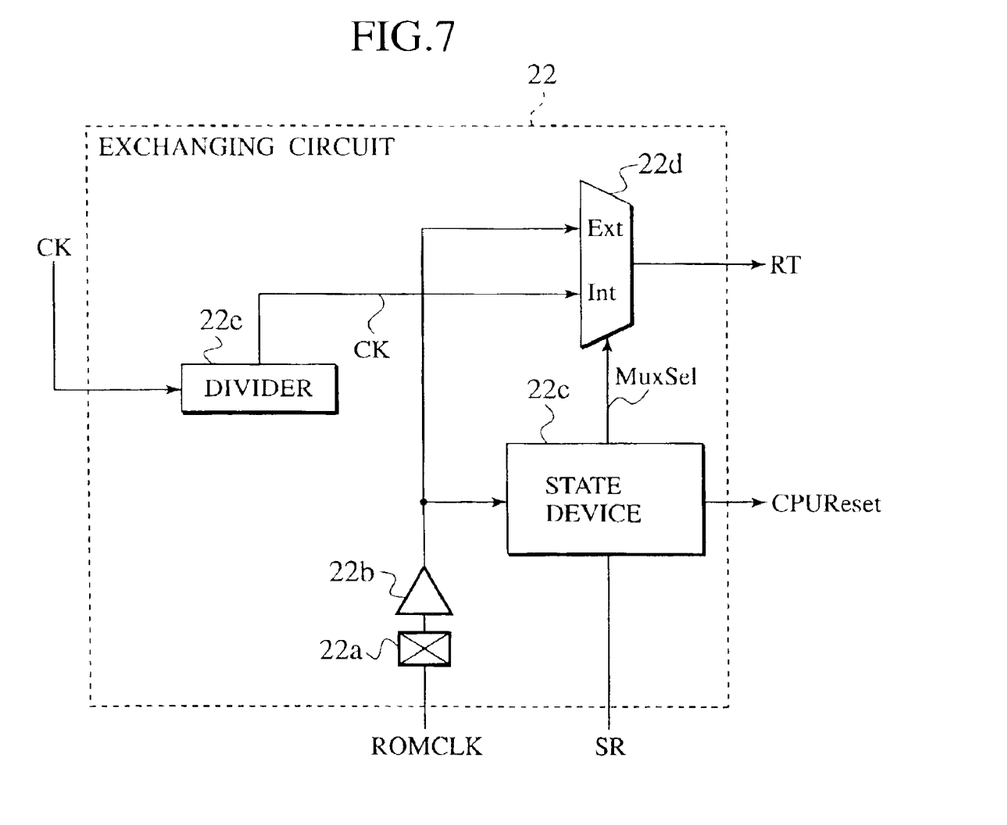
FIG. 7 is a circuit diagram showing a detailed constitution of an exchanging circuit of a computer system according to a second embodiment of the present invention.

Now, description will be made regarding an exchanging circuit 22 in a computer system according to a second embodiment of the present invention. FIG. 7 shows a detailed structure of the exchanging circuit 22, which can be applied to the computer system 10a having the system reset terminal 70 as shown in FIG. 2 and in the computer system 10b having the reset timer 23 as shown in FIG. 6.

An external clock ROMCLK, which is provided from outside through a terminal 22a and an input buffer 22b, is supplied to a state device 22c and is subjected to judgment as to whether the external clock ROMCLK contains an effective signal or not, and then supplied to an input side (an external clock side) of a signal switching selector 22d. The frequency of an internal clock CK is divided into a frequency suitable for ROM control by a divider 22e, and is supplied to another input side (an internal clock side) of the selector 22d.

Figure 8:
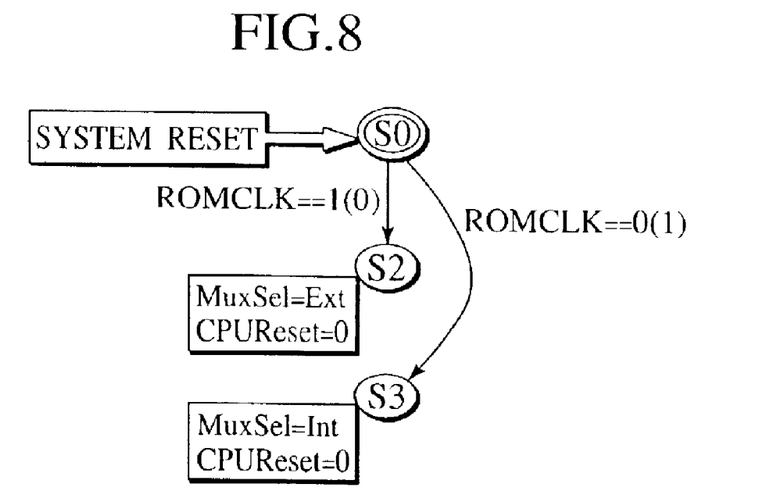
FIG. 8 is a view showing state transitions of a state device 22c in the second embodiment of the present invention.

FIG. 8 shows state transitions of the state device 22c in the second embodiment. After the system reset signal SR is supplied, the state device 22c transits the state to an initial state S0. The state device 22c inspects a logic value of the external clock ROMCLK at a time when the system reset signal SR is negated. If the value is "1" (or "0"), the state device 22c judges the logic value as an instruction to use the external clock ROMCLK, and then fixes the selector 22d to the external clock side (MuxSel=Ext).

On the contrary, if the logic value of the external clock ROMCLK at the release point of the system reset is "0" (or "1"), the state device 22c judges the logic value as an instruction to use the internal clock CK and then fixes the selector 22d to an internal clock side (MuxSel=Int).

In the constitution of the second embodiment as described above, judgment as to which one of the external clock ROMCLK and the internal clock CK is to be used is performed immediately after inactivation of the system reset signal SR. Accordingly, it is not necessary to inhibit the CPU 11 to read out a first instruction, and a CPUReset signal is negated simultaneously with the system reset SR.

Note that logic simulation according to the second embodiment is carried out as similar to the first embodiment. In the case of using an actual chip, the external clock ROMCLK is fixed to "0" (or "1") when the internal clock CK is used. When the external clock ROMCLK is used, then an external clock generator is designed such that the value of the external clock ROMCLK in an inactive state of the system reset signal SR is set to "1" (or "0") so as to be synchronized with the system reset signal SR.

Incidentally, an operation after the reset of the CPU is released by inactivation of the CPUReset signal is similar to the first embodiment.

(Third Embodiment)

Figure 9:
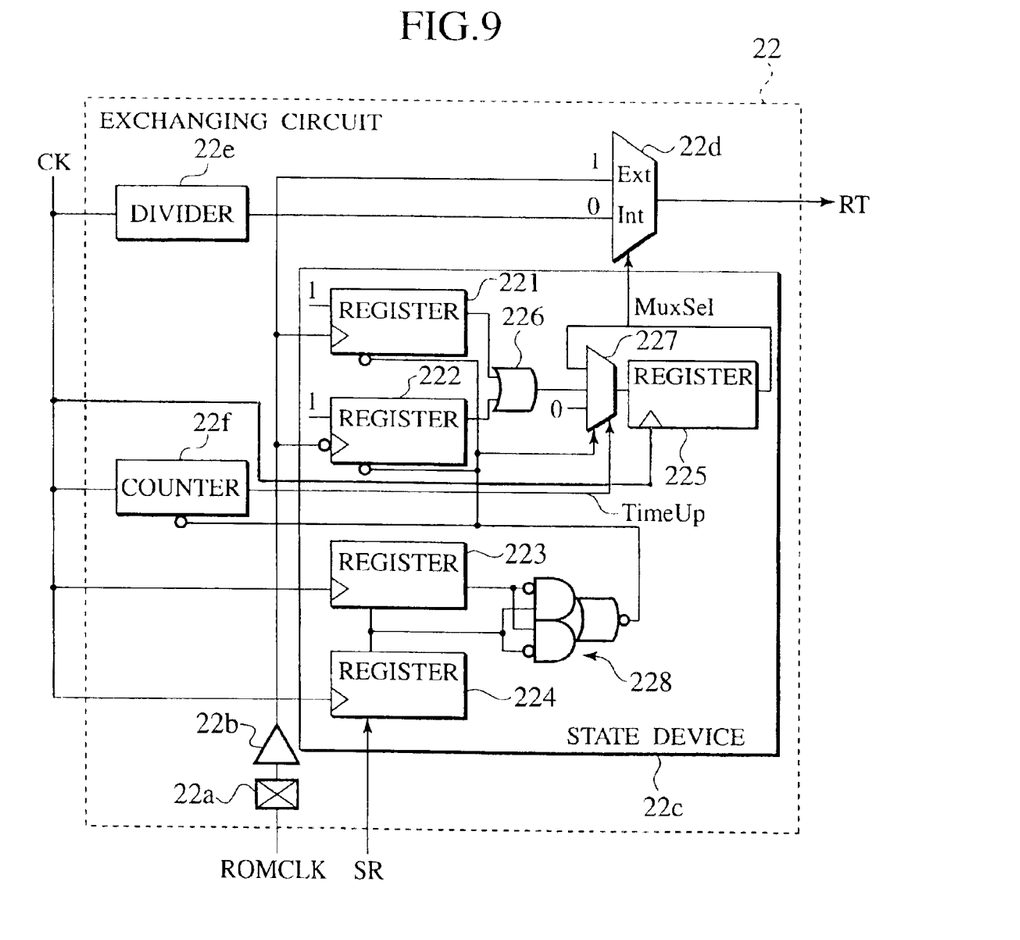
FIG. 9 is a circuit diagram showing a detailed constitution of an exchanging 22 according to a third embodiment of the present invention.

As shown in FIG. 9, an exchanging circuit 22 in a computer system according to a third embodiment of the present invention includes a timing input terminal 22a and an input buffer 22b for receiving an external clock ROMCLK, a divider 22e for dividing the frequency of an internal clock CK into a frequency suitable for ROM control, a counter 22f for performing measurement of measuring time necessary for judgment of the received external clock ROMCLK as to whether the external clock ROMCLK contains an effective signal, a state device 22c for judging as to which one of the external clock ROMCLK and the divided internal clock CK is to be used as a timing signal, and a selector 22d for selecting either the external clock ROMCLK or the divided internal clock CK in accordance with the judgment by the state device 22c and for supplying the selected signal as a ROM timing signal RT. A exchanging circuit 22, of which a detailed constitution is illustrated in FIG. 9, may be applied in the computer system 10a having the system reset terminal 70 as shown in FIG. 2 or in the computer system 10b having the reset timer 23 as shown in FIG. 6.

The state device 22c includes a first register 221 and a second register 222 to which the external clock ROMCLK is supplied, and a third register 223 and a fourth register 224 to which the internal clock CK and the system reset SR are supplied. In addition, the state device 22c includes a logic sum (OR) gate 226 for obtaining a logic sum of outputs from the first register 221 and the second register 222, and a composite gate 228 for detecting variation of the system reset SR by use of outputs from the third register 223 and the fourth register 224. Furthermore, the state device 22c includes an internal selector 227 for receiving an output from the logic sum gate 226 and a TimeUp signal from the counter 22f, and a fifth register 225 for storing a value selected by the internal selector 227.

Next, description will be made regarding an operation of the exchanging circuit 22 according to the third embodiment. In the third embodiment, a positive edge and a negative edge of the external clock ROMCLK are detected. The external clock ROMCLK is used if any one of the edges is present, and the internal clock CK is used if no edge is present in a given time period.

First, judgment is started by means of detecting variation of the system reset signal SR with the third register 223, the fourth register 224 and the composite gate 228. Detection of the variation of the system reset signal SR with the third register 223 and the fourth register 224 is performed so as to be synchronized with a positive edge cycle of the internal clock CK. At a point of starting the judgment, the internal selector 227 selects "0" so as to use the internal clock CK as the ROM timing signal RT, whereby "0" is set to the fifth register 225 to constitute MuxSel=Int(0). Simultaneously, the first register 221 and the second register 222 are initialized to "0" by a signal supplied by the composite gate 228, and the counter 22f is reset.

When initialization is completed by resetting, the internal selector 227 proceed to selection of an output from the logic gate 226 attached to the first register 221 and the second register 222.

Here, if the external clock ROMCLK changes from "0" to "1", that is the positive edge, the value at the first register 221 is set to "1". On the contrary, if the external clock ROMCLK changes from "1" to "0", that is the negative edge, the value at the second register 222 is set to "1". In this way, when any one of the first register 221 and the second register 222 detects the edge, the output from the logic sum gate 226 is set to "1", whereby the fifth register 225 is set to "1" by the internal selector 227.

Next, the counter 22f supplies the TimeUp signal to the internal selector 227 after passage of a predetermined time period in a range from several microseconds to several milliseconds corresponding to one cycle of the lowest frequency of the external clock ROMCLK. Upon receipt of the TimeUp signal, the internal selector 227 selects the output of the fifth register 225 and judges as to whether the edge of the external clock ROMCLK is present or not. MuxSel=Ext(1) is satisfied if the edge of the external clock ROMCLK is present in the detected period, whereby the selector 22d selects the external clock ROMCLK as the ROM timing signal RT. On the contrary, MuxSel=Int(0) is satisfied if no edge of the external clock ROMCLK is present, whereby the selector 22d selects the divided internal clock CK as the ROM timing signal RT.

According to the third embodiment, the variation of the external clock ROMCLK is detected by the clock signals fed to the registers. Therefore, it is possible to detect the edge even if the external clock ROMCLK has a frequency higher than a half of the frequency of the internal clock.

Various modifications will become possible for those skilled in the art after receiving the teachings of the present disclosure without departing from the scope thereof.

What is claimed is:

1. A computer system, comprising:
    a central processing unit configured to execute instructions;
    a timing generator configured to provide an internal clock; and
    a selector configured to receive an external clock and the internal clock, and to select any one of the external clock and the internal clock as a read-out timing signal with respect to an external memory device storing an instruction to be executed initially after a power source is turned on.

2. The computer system of claim 1, wherein the selector selects the read-out timing signal in accordance with a value of the external clock at a time of resetting the central processing unit.

3. The computer system of claim 2, further comprising a divider configured to divide frequency of the internal clock and to provide the divided internal clock to the selector, the divider being connected to the timing generator.

4. The computer system of claim 1, further comprising a state device configured to receive the external clock configured to judge variation of a value of the external clock, wherein the selector selects the read-out timing signal depending on judgment by the state device.

5. The computer system of claim 4, wherein the state device retains a CPU-reset signal to be supplied to the central processing unit until the selector determines signal selection.

6. The computer system of claim 4, further comprising a counter configured to measure a time period equivalent to one cycle of the lowest frequency of the external clock and to provide a time-up signal to the state device.

7. The computer system of claim 6, wherein the timing generator is connected to the counter in order to use the internal clock for measurement of the time period.

8. The computer system of claim 6, further comprising a reference time generator configured to generate a clock for measurement of the time period, the reference time generator being connected to the counter.

9. The computer system of claim 4, further comprising a divider configured to divide frequency of the internal clock and to provide the divided internal clock to the selector, the divider being connected to the timing generator.

10. The computer system of claim 7, further comprising a divider configured to divide the internal clock and to provide the divided internal clock to the selector, the divider being connected to the timing generator.

11. The computer system of claim 8, further comprising a divider configured to divide frequency of the internal clock and to provide the divided internal clock to the selector, the divider being connected to the timing generator.

12. The computer system of claim 4, wherein the external clock is a signal to be provided by an external clock generator connected to the external clock input terminal.

13. The computer system of claim 4, wherein the external clock is a fixed signal provided to the external clock input terminal.

14. The computer system of claim 4, wherein the state device further comprises a first register receiving the external clock.

15. The computer system of claim 14, wherein the state device further comprises a second register receiving a reversed signal of the external clock.

16. The computer system of claim 15, wherein the state device further comprises a logic sum gate configured to provide a logic sum of outputs from the first and the second registers.

17. The computer system of claim 16, wherein the state device further comprises a third register receiving the internal clock and a system reset signal.

18. The computer system of claim 17, wherein the state device further comprises a fourth register receiving the internal clock and the system reset signal.

19. The computer system of claim 18, wherein the state device further comprises a composite gate configured to detect variation of the system reset signal by outputs from the third and the fourth registers.

20. The computer system of claim 19, wherein the state device further comprises an internal selector configured to select one of an output from the logic sum gate and a fixed value designating the internal clock.

21. The computer system of claim 20, wherein the state device further comprises a fifth register configured to store an output from the internal selector.

* * * * *